United States Patent [19]
Weber et al.

[11] 4,291,709
[45] Sep. 29, 1981

[54] INFEED GEOMETRY

[75] Inventors: Steven J. Weber, New Holland; E. W. Rowland-Hill, Lancaster, both of Pa.

[73] Assignee: Sperry Corporation, New Holland, Pa.

[21] Appl. No.: 165,173

[22] Filed: Jul. 2, 1980

[51] Int. Cl.³ .............................................. A01F 7/06
[52] U.S. Cl. .................................................. 130/27 T
[58] Field of Search ............ 130/27 R, 27 T, 27 HA, 130/26, 24; 56/14.6, 20, 21

[56] References Cited
U.S. PATENT DOCUMENTS

| | | | |
|---|---|---|---|
| 3,626,472 | 12/1971 | Rowland-Hill | 130/27 T |
| 3,827,443 | 8/1974 | Drayer | 130/27 T |
| 3,943,939 | 3/1976 | Rowland-Hill | 130/27 T |
| 3,994,303 | 11/1976 | Rowland-Hill | 130/27 T |
| 4,159,023 | 6/1979 | Todd et al. | 130/27 HA |

*Primary Examiner*—Robert A. Hafer
*Attorney, Agent, or Firm*—James R. Bell; Frank A. Seemar

[57] ABSTRACT

In an axial flow combine having at least one axially arranged threshing and separating unit which includes elements arranged for coaction together to thresh and separate crop material and feeding means forwardly thereof there is provided an improved feed ramp which forms a crop thinning chamber to facilitate imparting radial movement to the crop material as it is fed into the threshing rotor.

3 Claims, 5 Drawing Figures

U.S. Patent  Sep. 29, 1981  Sheet 3 of 3  4,291,709
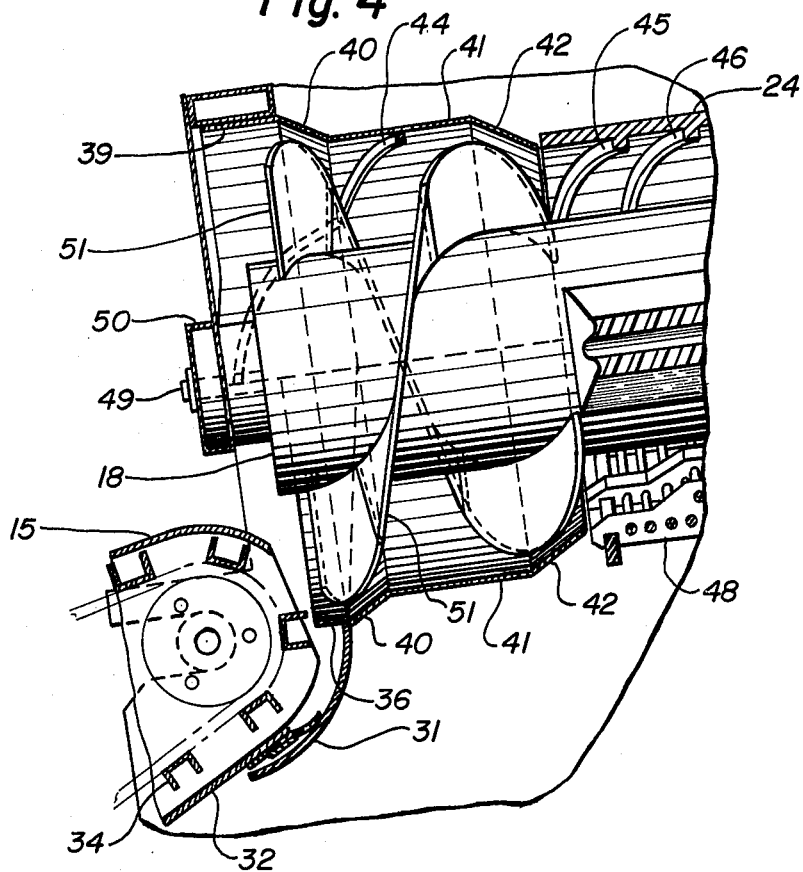
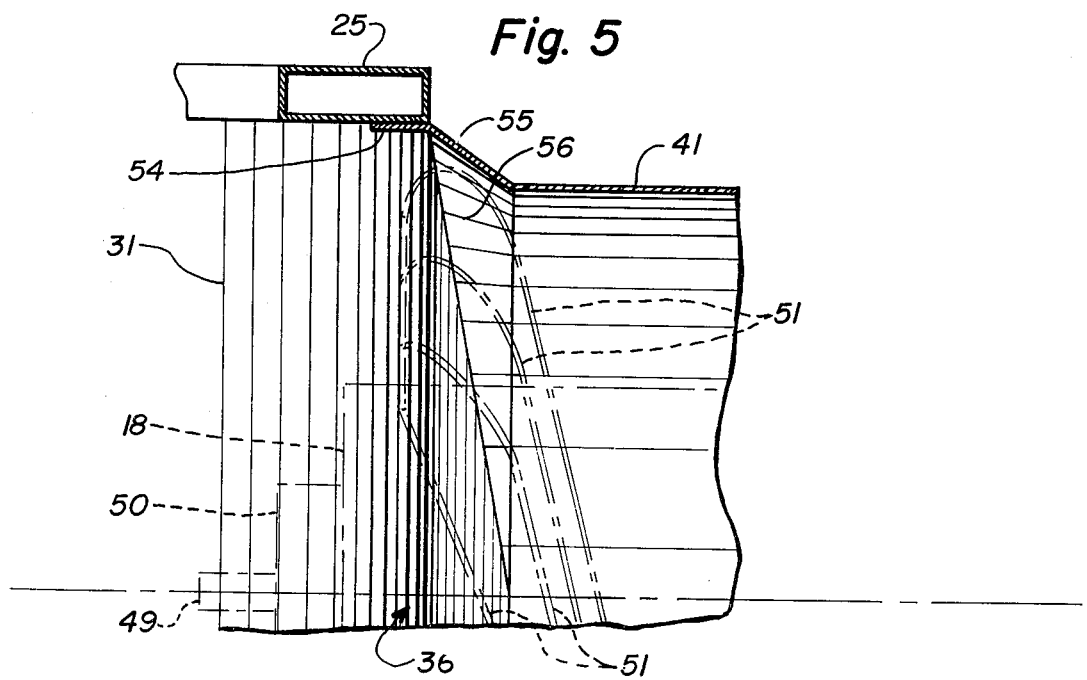

INFEED GEOMETRY

BACKGROUND OF INVENTION

This invention relates generally to crop harvesting and threshing machine, more commonly known as combines, and more particularly to the infeed area that is immediately adjacent to the forward portion of the threshing and separating rotor. This infeed area is utilized to impart a radial direction of crop material flow to the crop material as it enters the threshing and separating chamber which contains the threshing and separating rotor. Specifically, the invention is concerned with the geometry of this infeed area to maximize the amount of crop material which can be passed through the combine during field operation. This invention is equally applicable to an axial flow type of combine utilizing either a single threshing and separating rotor or multiple threshing and separating rotors.

Conventional type of combines pass the crop material to be threshed between a rotary cylinder and a stationary concave in a direction that is normal to the axis of the rotating cylinder and parallel with the longitudinal axis of the frame. In this system much of the grain contained in the crop material fed to the cylinder and the concave passes through the concave as grain. The remainder of the material is conveyed to separating elements of the combine that traditionally include reciprocating or oscillating straw walkers, return pans, and chaffer sieves. Such conventional combines suffer from the major disadvantage of having a threshing capacity that is limited by the single pass of the crop material about the threshing cylinder.

Combines of the axial flow type, in contrast, utilize single or dual threshing and separating rotors that permit the crop material to spiral rearwardly about each rotor thereby passing over the concave during the threshing process three or more times. This increased exposure to the rotor of the crop material as it spirals thereabout during the threshing process permits axial flow type of combines to increase the amount of grain obtained from any crop passed therethrough when compared with conventional combines.

The current axial flow combines utilize various means at the entrance point of the rotors to induce primarily an axial motion to the crop material until it enters the concave area. At this point, the crop material is accelerated into a radial path around the rotors. It is this radial path with its centrifugal force that accomplishes centrifugal threshing of the crop material. The key to efficient threshing and separating in axial flow combines is the early imparting of this radial motion to the crop material so that the spiralling action is initiated as soon as possible during the threshing process.

Different infeed geometries have been experimented with in each of the various type of axial flow combines in attempts to enhance the throughput characteristics of these relatively recent commercial machines. Additionally, roping of crop material, where the crop material forms rope-like tangled masses, especially common in tough green crop conditions, occasionally has been a problem in some designs.

The foregoing problems are solved in the design of the machine comprising the present invention by providing a crop thinning chamber or infeed area to the threshing and separating rotor having an improved geometry which facilitates imparting early in its travel a radial motion to the crop material as it enters the threshing and separating cylinders.

SUMMARY OF THE INVENTION

It is a principal object of the present invention to provide in a combine of the axial flow type a crop thinning chamber with an improved geometry that maintains a discrete clearance between the inner walls of the chamber and the rotor intake and transport members as the chamber and the rotor converge toward the threshing area, forming a generally frustrum-like outline.

It is another object of the present invention to provide an improved infeed geometry that facilitates the imparting of radial motion to the crop material as far forward as possible in the crop thinning chamber or infeed area.

It is a feature of the present invention that crop material entering the crop thinning chamber or rotor infeed area initially is induced to describe a much larger diameter than at the threshing area.

It is an advantage of the present invention that the improved infeed geometry reduces crop roping in tough, green crop conditions.

It is another invention that this improved infeed geometry yields improved combine throughput because of smoother infeed characteristics.

It is a further advantage that this improved infeed geometry facilitates the imparting of radial motion to the crop material flow as far forward as possible in the crop material infeed area.

These and other objects, features and advantages are obtained by providing an improved feed ramp which forms a crop thinning chamber to facilitate imparting radial movement to crop material as it is fed into the threshing rotor.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 4 is a side elevational view generally in the same view as shown in FIG. 3, but with the threshing and separating rotor shown in detail.

FIG. 5 is a partial top plan view of one of the crop thinning chambers or infeed area taken along the section line 5—5 of FIG. 2 with a threshing rotor shown in phantom to illustrate the path described by the auger flighting as the rotor is rotated.

DETAILED DESCRIPTION OF THE PREFERRED EMBODIMENT

Figure 1:
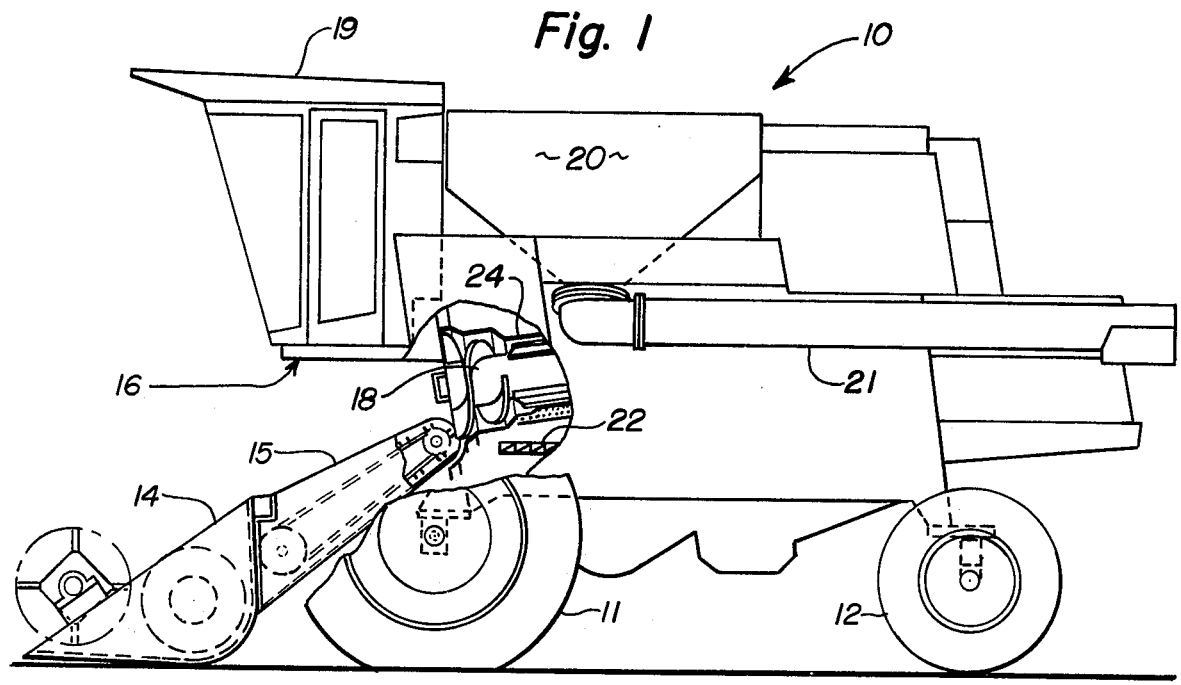
FIG. 1 is a side elevational view of the crop harvesting and threshing machine with the portions broken away illustrated in section to show the crop infeed area of the threshing rotor.

Referring to FIG. 1, there is shown a combine 10 in a side elevational view with the critical portions of this invention illustrated in a fragmentary manner by having their side coverings cut away and further shown in a partially sectional view. As can be seen, the combine 10 has a mobile frame mounted to a pair of primary driving wheels 11 in front and a pair of steerable wheels 12 in the rear. The combine is powered by an engine, usually a diesel engine of relatively high horsepower. The engine is mounted to the upper portion of the combine in suitable fashion and, by means of appropriate drive transfer means is connected to the operational components of the combine.

The combine 10 has a header 14 and an infeed housing 15 mounted to the front. The combine 10 has a main frame or housing indicated generally as 16 that internally supports two threshing and separating rotors 18, only one of which is shown in FIG. 1. Each of the rotors 18, has two spiralled auger flightings 51 attached to their forwardmost ends. The operator's cab 19 extends forwardly over the front of the main frame 16 and atop the infeed housing 15. The main frame 16 also supports the grain tank 20 and an unloading auger 21, as well as the grain pan 22 and grain cleaning means (not shown).

Figure 2:
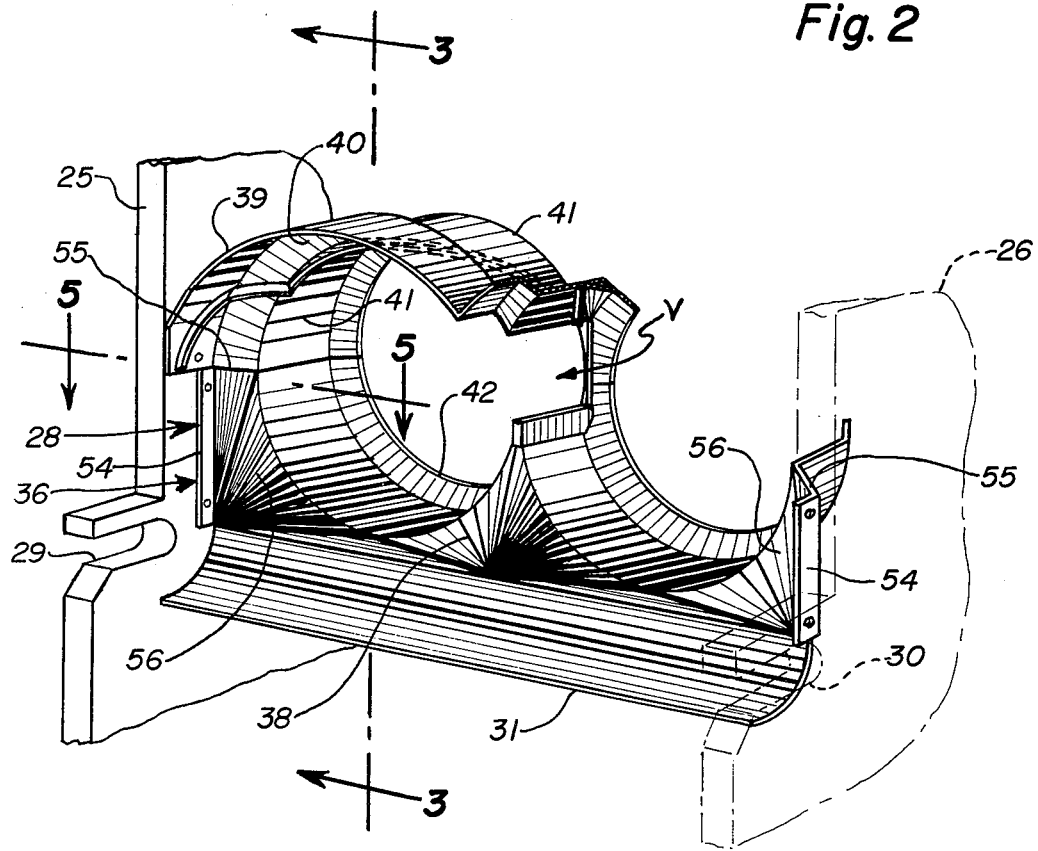
FIG. 2 is a perspective view showing in part the infeed geometry of the crop thinning chamber or infeed area.

The rotors 18 are enclosed in a rotor casing or chamber 24, only one of which is shown in FIG. 1. As seen in FIG. 2 the rotor casings are supported by side frame members 25 and 26. The crop thinning chamber, indicated generally by the numeral 28, consists of a series of progressively smaller diameter or stepped segments as the crop material follows the path of flow from the header toward the threshing and separating rotor. The side frame members 25 and 26 have slots 29 and 30, respectively, into which opposing sides of the infeed housing 15 fit. A feed ramp 31 forms a floor and acts as a guide to direct crop material coming from the floor 32, see FIG. 3, of the infeed housing 15 up into the crop thinning chamber 28. The crop material is carried upwardly and rearwardly in the infeed housing by the chain and slat elevator 34, best seen in FIG. 3. A seal 35 prevents the loss of crop material between the floor 32 of the infeed housing 15 and the infeed ramp 31.

The crop thinning chamber 28, best seen in FIG. 2, has on the side of its bottom portion a pair of angled and arcuately shaped guide ramps, 36 and 38. Guide ramp 36 is bolted to the side frame member 25. The chamber or infeed area 28 then essentially becomes a feed plate with a series of segmented steps. The first step segment 39 is the largest diameter and forwardmost on the chamber. The next contiguous step is angled at a decreasing radius or diameter and is seen as segment 40, extending in an arc about the top half of the chamber 28. Adjacent this is an essentially full circle constant diameter step 41. Lastly in the rearward progression of the chamber is the transition ring 42 which is angled inwardly at a decreasing diameter until it finally is essentially the same diameter as the rotor casing 24. A segmented transport fin 44, best seen in FIGS. 3 and 4, assists the spiralling to the rear movement of the crop material from the constant diameter segment 39 to the smaller diameter segment 41. Within rotor casing 24 on the inside surface a plurality of shorter transport fins, two of which are exemplarly shown as fins, 45 and 46, continue along essentially the full length of the casing to assist in spiralling the crop material rearwardly about the rotor.

Guide ramps 36 and 38 are positioned at the front of each crop thinning chamber 28, with guide ramp 36 being outboard and guide ramp 38 being inboard adjacent the centerline of the combine, best seen in FIG. 2. Guide ramp 36 actually comprises three distinct sections all seen in various views in FIGS. 2, 3 and 5. Ramp 36, as previously explained, is bolted to side frame member 25 via flange member 54. A corresponding flange member 54 is also bolted in FIG. 2 to the opposing side frame member 26. Adjacent the flange member 54 is tapered guide section 55. Joined to guide section 55 is a partially conical section 56 that curves downwardly into contact with the rear of the infeed ramp 31. Guide ramp 38 terminates approximately midway to the top of chamber 28. When two rotors are used, as seen in FIG. 2, the side-by-side chambers 28 are separated by a void V between the tops of the adjacent guide ramps 38 and the tops of the individual chambers 28 formed by segments 39 and 40 and the step 41. This void V permits the auger flightings 51 of each rotor 18 to overlap, helping to establish an even flow of crop material between the rotors 18.

Figure 3:
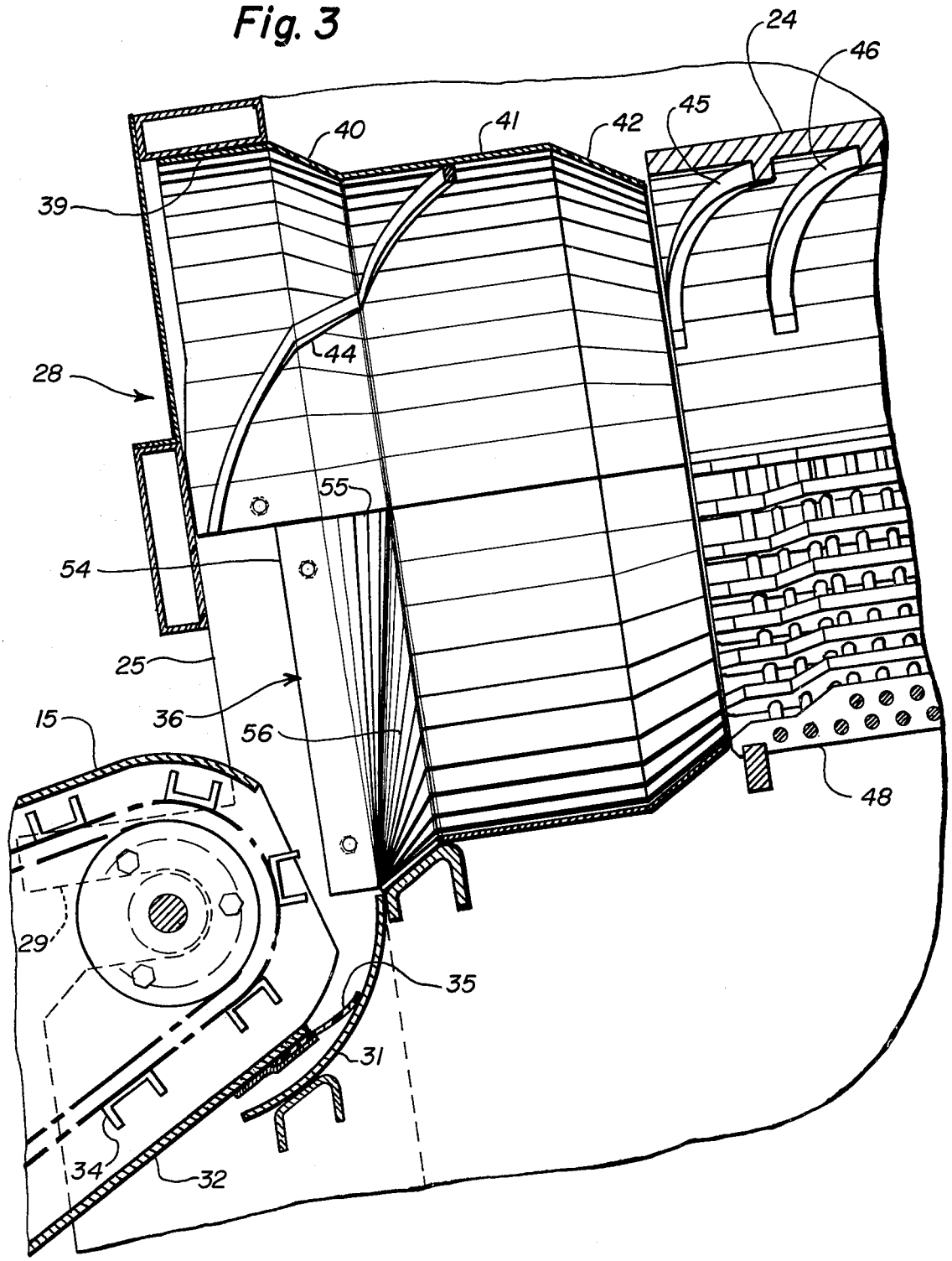
FIG. 3 is an enlarged side elevational view of the crop thinning chamber and the crop infeed elevator taken along the lines 3—3 of FIG. 2 without the threshing and separating rotor.

As most clearly seen in FIGS. 3 and 4, arcuately shaped concaves 48 comprise the front lower portion of the rotor casing 24. These concaves are of conventional design and will not be explained further since they are familiar to one of ordinary skill in the art. Similarly, conventional separation grates, not shown, comprise the rear bottom portion of each casing 24. As seen in FIG. 4, the rotor 18 is mounted via shaft 49 into a rotor bearing 50 in the front of the crop thinning chamber 28.

In operation, the combine 10 is propelled across a field of uncut crop material by the power transmitted from the engine. The header 14 serves to cut the standing crop material, consolidate it and transfer it rearwardly and upwardly into the infeed housing 15. The crop elevator 34 within the infeed housing 15 then continues to rearwardly and upwardly move the crop material into the crop thinning chamber 28. Once within the crop thinning chamber or infeed area 28 the crop material is engaged by the infeed auger flightings 51 which commence the radial and rearward spiralling motion of the crop material. Crop material initially passes into the chamber at the constant diameter segment 39 and then is gradually moved rearwardly and inwardly by the decreasing diameter of the segment 40. Transfer fin 44 serves to assist in the rearward movement of the crop material into the constant diameter step 41, while the auger flightings 51 continue to spiral the crop material rearwardly into the decreasing diameter step 40 past step 41 into the decreasing diameter transition ring 42. The crop material then is passed into the threshing and separating portions of the rotor 18 within the rotor casing 24. The gradual and stepped decreasing diameter in the crop thinning chamber 28 permits the crop material to enter and be engaged by the auger flighting 51 to have radial movement imparted thereto. The decreasing diameter of the chamber 28 forms a frustrum-like outline moving from the broad inlet and converging toward the diameter of the front of the rotor casing 28. The particular geometry of the infeed area has been designed and is effective to impart radial movement to the crop material as far forward as possible as the crop material is moved into the threshing rotor.

While the preferred structure in which the principles of the present invention have been incorporated as shown and described above, it is to be understood that the invention is not to be limited to the particular details as presented, but in fact, widely different means may be employed in the practice of the broader aspects of this invention. The scope of the appended claims is intended to encompass all obvious changes in details, materials and arrangements of parts which will occur to one of skill in the art upon the reading of the disclosure.

Having thus described the invention what is claimed is:

1. In a rotary combine having at least one elongate generally cylindrical threshing chamber therein with a first end and an opposing second end defining a working surface at least partially corresponding to the interior surface thereof, at least one elongate generally cylindrical threshing rotor mounted within the chamber for rotation relative thereto about the longitudinal axis thereof, the rotor having an infeed auger adjacent infeed means at the first end of the threshing chamber, the diameters of the threshing chamber and the rotor being of such a relationship so as to form a cavity therebetween into which crop material may be fed for threshing and grain separation, a crop thinning chamber between the infeed means and the threshing chamber, the improvement comprising:

(a) the auger being generally tapered so that the surface of rotation defines a frustrum with the base being oriented toward the infeed means and,
   (b) the crop thinning chamber defining a series of steps including a first step having an arcuate constant diameter segment, a second step having an arcuate decreasing diameter segment, said first and second steps being diametrically opposite a plurality of angled infeed ramps, a third step having a tubular constant diameter segment and a fourth step having a tubular decreasing diameter segment.

2. The rotary combine according to claim 1 wherein the diameter of the second step decreases at a uniform rate.

3. The rotary combine according to claim 2 wherein the diameter of the fourth step decreases at a uniform rate.

* * * * *